(12) United States Patent
Henderson

(10) Patent No.: US 7,217,463 B2
(45) Date of Patent: May 15, 2007

(54) MACHINE DIRECTION ORIENTED POLYMERIC FILMS AND METHODS OF MAKING THE SAME

(75) Inventor: Kevin O. Henderson, Willoughby Hills, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/606,461

(22) Filed: Jun. 26, 2003

(65) Prior Publication Data

US 2004/0033349 A1 Feb. 19, 2004

Related U.S. Application Data

(60) Provisional application No. 60/424,883, filed on Nov. 8, 2002, provisional application No. 60/391,983, filed on Jun. 26, 2002.

(51) Int. Cl.
*B32B 27/32* (2006.01)
(52) U.S. Cl. .................. 428/516; 428/343; 428/354; 428/901
(58) Field of Classification Search ............... 525/240; 428/516, 343, 354, 910
See application file for complete search history.

(56) References Cited

U.S. PATENT DOCUMENTS 3,207,735 A 9/1965 Wijga ................ 260/93.7

(Continued)

FOREIGN PATENT DOCUMENTS

| EP | 0029368 | 5/1981 |
|---|---|---|
| EP | 0122495 | 10/1984 |
| EP | 0185454 | 6/1986 |

(Continued)

OTHER PUBLICATIONS

N.R. Dharmarajan and T.C. Yu, Modifying Polypropylene With a Metallocene Plastomer, Plastics Engineering, pp. 33-35, Aug. 1996 (3 pages).

(Continued)

*Primary Examiner*—D. Lawrence Tarazano
(74) *Attorney, Agent, or Firm*—Renner, Otto, Boisselle & Sklar, LLP

(57) ABSTRACT

This invention relates to a film comprising a machine direction oriented polymeric film prepared from (A) at least one propylene homopolymer or copolymer or lend of two or more thereof, wherein (A) has a melt flow rate from about 6 to about 30 and (B) an olefin elastomer having a melt flow rate of 0.5 to 10. In one embodiment, the film also contains a nucleating agent. In one embodiment, these films are clear. The films have good stiffness and clarity with low haze. These films are useful in preparing labels and may be used as a monolayer film or in a multilayer film. In one embodiment, the films are printable. Die-cut labels are also described which comprise a composite comprising the extruded, machine-direction oriented polypropylene copolymer films of the present invention in combination with an adhesive associated with said copolymer films for adhering said label to a substrate. Multilayer composites also are described which comprise a label facestock material comprising an extruded oriented multilayer film of the present invention, an adhesive layer associated with said facestock material, and a release-coated liner or carrier. Combinations of the labels of the present invention joined with layer of adhesive to a substrate such as glass bottles also are described.

37 Claims, 2 Drawing Sheets

U.S. PATENT DOCUMENTS

| | | | |
|---|---|---|---|
| 3,207,736 A | 9/1965 | Wijga | 260/93.7 |
| 3,207,737 A | 9/1965 | Wales | 260/93.7 |
| 3,207,738 A | 9/1965 | Wijga | 260/93.7 |
| 3,207,739 A | 9/1965 | Wales | 260/93.7 |
| 4,016,118 A | 4/1977 | Hamada et al. | 260/17.4 |
| 4,188,350 A * | 2/1980 | Vicik et al. | 525/232 |
| 4,205,021 A | 5/1980 | Morita et al. | 525/240 |
| 4,207,363 A | 6/1980 | Lustig et al. | 428/35 |
| 4,314,039 A | 2/1982 | Kawai et al. | 525/1 |
| 4,340,640 A | 7/1982 | Weiner | 428/349 |
| 4,371,645 A | 2/1983 | Mahaffey, Jr. | 524/108 |
| 4,399,180 A | 8/1983 | Briggs et al. | 428/35 |
| 4,405,667 A | 9/1983 | Christensen et al. | 428/35 |
| 4,407,873 A | 10/1983 | Christensen et al. | 428/35 |
| 4,407,874 A | 10/1983 | Gehrke | 428/35 |
| 4,434,264 A | 2/1984 | Ficker | 524/323 |
| 4,463,113 A | 7/1984 | Nakahara et al. | 524/117 |
| 4,508,872 A | 4/1985 | McCullough, Jr. | 525/88 |
| 4,514,534 A | 4/1985 | DiNardo | 524/108 |
| 4,532,280 A | 7/1985 | Kobayashi et al. | 524/108 |
| 4,535,125 A | 8/1985 | McCullough, Jr. | 525/88 |
| 4,564,559 A | 1/1986 | Wagner, Jr. et al. | 428/349 |
| 4,565,738 A | 1/1986 | Purdy | 428/349 |
| 4,581,262 A | 4/1986 | Karabedian | 428/35 |
| 4,585,679 A | 4/1986 | Karabedain | 428/35 |
| 4,588,775 A | 5/1986 | McCullough, Jr. | 525/88 |
| 4,604,324 A | 8/1986 | Nahmias et al. | 428/349 |
| 4,605,576 A | 8/1986 | Jabarin | 428/35 |
| 4,613,547 A | 9/1986 | Wagner, Jr. et al. | 428/349 |
| 4,621,119 A | 11/1986 | Lu | 525/240 |
| 4,626,574 A | 12/1986 | Cancio et al. | 525/240 |
| 4,634,735 A | 1/1987 | Thiersault et al. | 525/88 |
| 4,643,945 A | 2/1987 | Kiang | 428/349 |
| 4,663,216 A | 5/1987 | Toyoda et al. | 428/212 |
| 4,684,578 A | 8/1987 | Inoue et al. | 428/462 |
| 4,692,489 A | 9/1987 | Ficker et al. | 524/243 |
| 4,695,503 A | 9/1987 | Liu et al. | 428/207 |
| 4,704,421 A | 11/1987 | Teskin | 524/287 |
| 4,713,273 A | 12/1987 | Freedman | 428/40 |
| 4,720,427 A | 1/1988 | Clauson et al. | 428/349 |
| 4,748,206 A | 5/1988 | Nogiwa et al. | 525/88 |
| 4,752,597 A | 6/1988 | Turner | 502/104 |
| 4,778,697 A | 10/1988 | Genske et al. | 428/35 |
| 4,798,081 A | 1/1989 | Hazlitt et al. | 73/53 |
| 4,808,561 A | 2/1989 | Welborn, Jr. | 502/104 |
| 4,833,024 A | 5/1989 | Mueller | 428/349 |
| 4,843,129 A | 6/1989 | Spenadel et al. | 525/240 |
| 4,865,908 A | 9/1989 | Liu et al. | 428/248 |
| 4,880,422 A | 11/1989 | McBride | 604/389 |
| 4,937,299 A | 6/1990 | Ewen et al. | 526/119 |
| 4,988,465 A | 1/1991 | Lustig et al. | 428/35 |
| 5,026,778 A * | 6/1991 | Fujii et al. | 525/210 |
| 5,028,480 A | 7/1991 | Dean | 428/314.4 |
| 5,049,605 A | 9/1991 | Rekers | 524/108 |
| 5,085,816 A | 2/1992 | McCord | 264/171 |
| 5,100,728 A | 3/1992 | Plamthottam et al. | 428/345 |
| 5,151,309 A | 9/1992 | Dollinger | 428/40 |
| 5,186,782 A | 2/1993 | Freedman | 156/244.11 |
| 5,206,075 A | 4/1993 | Hodgson, Jr. | 428/216 |
| 5,212,246 A | 5/1993 | Ogale | 525/240 |
| 5,272,236 A | 12/1993 | Lai et al. | 526/348.5 |
| 5,275,886 A | 1/1994 | Chu et al. | 428/421 |
| 5,278,272 A | 1/1994 | Lai et al. | 526/348.5 |
| 5,332,542 A | 7/1994 | Yamanaka et al. | 264/509 |
| 5,342,868 A | 8/1994 | Kimura et al. | 524/108 |
| 5,358,792 A | 10/1994 | Mehta et al. | 525/240 |
| 5,376,417 A | 12/1994 | Amano et al. | 428/40 |
| 5,380,810 A | 1/1995 | Lai et al. | 526/352 |
| 5,382,631 A | 1/1995 | Stehling et al. | 525/240 |
| 5,395,471 A | 3/1995 | Obijeski et al. | 156/244.11 |
| 5,407,732 A | 4/1995 | Dokurno | 428/213 |
| 5,414,040 A | 5/1995 | McKay et al. | 524/576 |
| 5,424,362 A | 6/1995 | Hwang et al. | 525/71 |
| 5,427,807 A | 6/1995 | Chum et al. | 426/393 |
| 5,468,535 A | 11/1995 | Amano et al. | 428/40 |
| 5,474,820 A | 12/1995 | Murschal et al. | 428/35.7 |
| 5,482,780 A | 1/1996 | Wilkie et al. | 428/515 |
| 5,491,019 A | 2/1996 | Kuo | 428/213 |
| 5,492,757 A | 2/1996 | Schuhmann et al. | 428/329 |
| 5,503,923 A | 4/1996 | Goto et al. | 428/324 |
| 5,516,563 A | 5/1996 | Schumann | 428/34.2 |
| 5,525,695 A | 6/1996 | Lai et al. | 526/352 |
| 5,529,843 A | 6/1996 | Dries et al. | 428/336 |
| 5,530,055 A | 6/1996 | Needham | 524/528 |
| 5,560,563 A | 10/1996 | Janson, Jr. et al. | 242/348.2 |
| 5,560,885 A | 10/1996 | Murschall et al. | 264/469 |
| 5,562,958 A | 10/1996 | Walton et al. | 428/34.9 |
| 5,582,923 A | 12/1996 | Kale et al. | 428/523 |
| 5,591,390 A | 1/1997 | Walton et al. | 264/456 |
| 5,594,070 A | 1/1997 | Jacoby et al. | 525/88 |
| 5,595,705 A | 1/1997 | Walton et al. | 264/456 |
| 5,665,800 A | 9/1997 | Lai et al. | 524/115 |
| 5,674,342 A | 10/1997 | Obijeski et al. | 156/244.11 |
| 5,677,383 A | 10/1997 | Chum et al. | 525/240 |
| 5,685,128 A | 11/1997 | Chum et al. | 53/441 |
| 5,691,043 A | 11/1997 | Keller et al. | 428/212 |
| 5,709,937 A | 1/1998 | Adams et al. | 428/332 |
| 5,711,839 A | 1/1998 | Dronzek, Jr. | 156/277 |
| 5,712,031 A | 1/1998 | Kelch et al. | 428/355 |
| 5,756,169 A | 5/1998 | Peiffer et al. | 428/34.9 |
| 5,759,648 A | 6/1998 | Idlas | 428/34.9 |
| 5,773,155 A | 6/1998 | Kale et al. | 428/523 |
| 5,783,638 A | 7/1998 | Lai et al. | 525/240 |
| 5,792,549 A | 8/1998 | Wilkie | 428/215 |
| 5,847,053 A | 12/1998 | Chum et al. | 525/240 |
| 5,852,152 A | 12/1998 | Walton et al. | 526/348.1 |
| 5,863,665 A | 1/1999 | Kale et al. | 428/523 |
| 5,874,139 A | 2/1999 | Bosiers et al. | 428/35.2 |
| 5,885,699 A | 3/1999 | Watson et al. | 428/212 |
| 5,885,707 A | 3/1999 | Kaschel et al. | 428/349 |
| 5,897,941 A | 4/1999 | Shah | 428/213 |
| 5,900,310 A | 5/1999 | Murschall et al. | 428/214 |
| 5,907,942 A | 6/1999 | Eichbauer | 53/441 |
| 5,922,800 A | 7/1999 | Crotty et al. | 524/425 |
| 5,932,157 A | 8/1999 | Dries et al. | 264/176.1 |
| 5,955,205 A | 9/1999 | Ramsey et al. | 428/516 |
| 5,962,092 A | 10/1999 | Kuo et al. | 428/34.9 |
| 5,972,443 A | 10/1999 | Breck et al. | 428/35.2 |
| 5,972,444 A | 10/1999 | Patel et al. | 428/35.2 |
| 5,986,028 A | 11/1999 | Lai et al. | 526/126 |
| 5,998,017 A | 12/1999 | Eichbauer | 428/343 |
| 6,017,615 A | 1/2000 | Thakker et al. | 428/213 |
| 6,020,046 A | 2/2000 | Abhau | 428/156 |
| 6,051,305 A | 4/2000 | Hsu | 428/195.1 |
| 6,060,567 A | 5/2000 | Lai et al. | 526/126 |
| 6,072,005 A | 6/2000 | Kobylivker et al. | 525/240 |
| 6,083,611 A | 7/2000 | Eichbauer et al. | 428/213 |
| 6,093,480 A | 7/2000 | Eichbauer et al. | 428/213 |
| 6,094,889 A | 8/2000 | Van Loon et al. | 53/450 |
| 6,096,014 A | 8/2000 | Haffner et al. | 604/367 |
| 6,111,023 A | 8/2000 | Chum et al. | 525/240 |
| 6,111,102 A | 8/2000 | Schlegel | 544/213 |
| 6,136,937 A | 10/2000 | Lai et al. | 526/352 |
| 6,140,442 A | 10/2000 | Knight et al. | 526/348.1 |
| 6,183,856 B1 | 2/2001 | Amon et al. | 428/318.4 |
| 6,194,532 B1 | 2/2001 | Maugans et al. | 526/348 |
| 6,197,886 B1 | 3/2001 | Chatterjee et al. | 525/240 |
| 6,204,335 B1 | 3/2001 | Somers | 525/240 |
| 6,231,936 B1 | 5/2001 | Kozimor et al. | 428/34.7 |
| 6,231,975 B1 | 5/2001 | Kong et al. | 428/355 |
| 6,248,851 B1 | 6/2001 | Maugans et al. | 526/348 |
| 6,288,168 B1 | 9/2001 | Shiromoto et al. | 525/88 |
| 6,300,419 B1 | 10/2001 | Sehanobish | 525/191 |
| 6,303,233 B1 | 10/2001 | Amon et al. | 428/516 |

| | | | |
|---|---|---|---|
| 6,306,518 B1 | 10/2001 | Shah et al. | 428/516 |
| 6,316,549 B1 | 11/2001 | Chum et al. | 525/240 |
| 6,319,975 B1 | 11/2001 | Lee et al. | 524/423 |
| 6,322,883 B1 | 11/2001 | Williams | 428/308.4 |
| 6,329,454 B1 | 12/2001 | Krabbenberg | 524/252 |
| 6,333,096 B1 | 12/2001 | Rodgers et al. | 428/213 |
| 6,340,532 B1 | 1/2002 | Huang et al. | 428/523 |
| 6,344,250 B1 | 2/2002 | Arthurs | 428/34.9 |
| 6,348,555 B1 | 2/2002 | Lai et al. | 526/336 |
| 6,362,270 B1 | 3/2002 | Chaudhary et al. | 524/515 |
| 6,364,988 B1 | 4/2002 | Lin | 156/244.17 |
| 6,368,545 B1 | 4/2002 | Bailey et al. | 264/514 |
| 6,376,058 B1 | 4/2002 | Schut et al. | 428/220 |
| 6,379,605 B1 | 4/2002 | Lin | 264/514 |
| 6,384,123 B1 | 5/2002 | Young | 524/451 |
| 6,391,425 B1 | 5/2002 | Migliorini et al. | 428/172 |
| 6,410,648 B1 | 6/2002 | Saski et al. | 525/191 |
| 6,423,420 B1 | 7/2002 | Brant et al. | 428/516 |
| 6,436,496 B1 | 8/2002 | Rackovan et al. | 428/34.9 |
| 6,436,534 B1 | 8/2002 | Knight et al. | 428/365 |
| 6,440,533 B1 | 8/2002 | Ray et al. | 428/172 |
| 6,441,094 B1 | 8/2002 | Cecchin et al. | 525/191 |
| 6,448,355 B1 | 9/2002 | Knight et al. | 526/348 |
| 6,451,426 B2 | 9/2002 | Kong et al. | 428/355 |
| 6,455,171 B2 | 9/2002 | Scheibelhoffer | 428/517 |
| 6,461,706 B1 | 10/2002 | Friedman et al. | 428/40.1 |
| 6,472,077 B1 | 10/2002 | Cretekos et al. | 428/447 |
| 6,486,284 B1 | 11/2002 | Karande et al. | 526/348.1 |
| 6,489,019 B1 | 12/2002 | Shah et al. | 428/325 |
| 6,495,266 B1 | 12/2002 | Migliorini | 428/461 |
| 6,500,563 B1 | 12/2002 | Datta et al. | 428/521 |
| 6,500,901 B2 | 12/2002 | Somers | 525/240 |
| 6,503,619 B1 | 1/2003 | Neal et al. | 428/343 |
| 6,503,635 B1 | 1/2003 | Kong et al. | 428/461 |
| 6,503,637 B1 | 1/2003 | Van loon | 428/516 |
| 6,506,867 B1 | 1/2003 | Lai et al. | 526/352 |
| 6,515,093 B1 | 2/2003 | Somers | 526/348.1 |
| 6,534,612 B1 | 3/2003 | Lai et al. | 526/348 |
| 6,548,611 B2 | 4/2003 | Lai et al. | 526/126 |
| 6,566,450 B2 | 5/2003 | Debras et al. | 525/191 |
| 6,583,209 B2 | 6/2003 | Mehta et al. | 524/445 |
| 6,583,227 B2 | 6/2003 | Mehta et al. | 525/240 |
| 6,982,311 B2 | 1/2006 | Karande et al. | 526/348.1 |
| 2001/0041776 A1 | 11/2001 | Lai et al. | 526/126 |
| 2002/0065384 A1 | 5/2002 | Knight et al. | 526/348.1 |
| 2003/0072957 A1 | 4/2003 | Lee et al. | 428/515 |
| 2003/0078357 A1 | 4/2003 | Lai et al. | 526/335 |
| 2003/0114579 A1 | 6/2003 | Mori et al. | 524/515 |
| 2004/0110019 A1 | 6/2004 | Schubert et al. | 428/515 |
| 2006/0040100 A1 | 2/2006 | Nemoto et al. | 428/328 |
| 2006/0057410 A1 | 3/2006 | Saavedra et al. | 428/515 |

FOREIGN PATENT DOCUMENTS

| | | |
|---|---|---|
| EP | 0277289 | 8/1988 |
| EP | 341 091 | 11/1989 |
| EP | 0377289 | 7/1990 |
| EP | 0416815 | 3/1991 |
| EP | 0575465 | 9/1992 |
| EP | 0 589 213 | 8/1993 |
| EP | 0608369 | 1/1994 |
| EP | 0619827 | 10/1994 |
| EP | 0831994 | 4/1995 |
| EP | 0681592 | 11/1995 |
| EP | 0696300 | 2/1996 |
| EP | 0706448 | 4/1996 |
| EP | 0782589 | 7/1997 |
| EP | 0783006 | 7/1997 |
| EP | 0787167 | 8/1997 |
| EP | 0899278 | 3/1999 |
| EP | 0899279 | 3/1999 |
| EP | 1044995 | 10/2000 |
| EP | 1116745 | 7/2001 |
| JP | 52-109580 | 9/1977 |
| JP | 60178132 | 9/1985 |
| JP | 62-121709 | 6/1987 |
| WO | 90/03414 | 4/1990 |
| WO | 9303093 | 2/1993 |
| WO | 9313143 | 7/1993 |
| WO | 9409060 | 4/1994 |
| WO | 9532242 | 11/1995 |
| WO | 96/21557 | 7/1996 |
| WO | 97/08238 | 3/1997 |
| WO | 01/70484 | 9/2001 |
| WO | 03/011584 | 2/2003 |

OTHER PUBLICATIONS

Huntsman, product data sheet for P5M4K-046, May 2002 (1 page).
EXXONMOBIL Chemical, product data sheet for EXACT 4151, Oct. 15, 1999 (1 page).
Webpage printout from www.polymersdatabase.com for VLDPE printed Jul. 29, 2003, copyright notice 2000, CRC Press, pp. 1-4 (4 pages).
Webpage printout from www.polymersdatabase.com for LDPE printed Jul. 29, 2003, copyright notice 2000, CRC Press, pp. 1-9 (9 pages).
Webpage printout from www.polymersdatabase.com for LLDPE printed Jul. 29, 2003, copyright notice 2000, CRC Press, pp. 1-10 (10 pages).
Webpage printout from www.polymersdatabase.com for MDPE printed Jul. 29, 2003, copyright notice 2000, CRC Press, pp. 1-5 (5 pages).
Webpage printout from www.polymersdatabase.com for Polyethylene, High Density printed Jul. 29, 2003, copyright notice 2000, CRC Press, pp. 1-13 (13 pages).
Webpage printout from www.polymersdatabase.com for Ultra High Molecular Weight PE printed Jul. 29, 2003, copyright notice 2000, CRC Press, pp. 1-6 (6 pages).
EP 03 01 4616; European Search Report mailed Sep. 26, 2003.
Written Opinion mailed May 15, 2006 in corresponding International Application No. PCT/US03/20281.
M. Tanaka; High Value Added Film Using an Olefin Based Elastomer; Specialty Plastics Conference, Zuerich, Dec. 3-4, 1990.
TAFMER® "A" - A New Polyolefin Resin With Excellent Flexibility, Mitsui Petrochemical Industries, January 1977 (Mitsui, 1977).
TAFMER® "P" - A New-Type Elastomer as Plastics Modifying Agent Supplied in Pellet Form, Mitsui Petrochemical Industries, August 1975 (Mitsui, 1975).

* cited by examiner

MACHINE DIRECTION ORIENTED POLYMERIC FILMS AND METHODS OF MAKING THE SAME

CROSS REFERENCE TO RELATED APPLICATIONS

This application claims priority from provisional application U.S. Ser. No. 60/391,983 filed Jun. 26, 2002 and provisional application U.S. Ser. No. 60/424,883 filed Nov. 8, 2002. The provisional applications are hereby incorporated by reference in their entirety.

FIELD OF THE INVENTION

This invention relates to a method of preparing machine-direction oriented monolayer or multilayer films, and methods of making the same. The invention also relates to the preparation of labels and other composites using such machine-direction oriented polymer films.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in mm is covered by a release liner or carrier. The liner or carrier protects the adhesive during shipment and storage and allows for efficient handling of an array of individual labels after the labels are die-cut and the matrix is stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

In many label applications, it is desirable that the facestock material be a film of polymeric material which can provide properties lacking in paper, such as clarity, durability, strength, water-resistance, abrasion-resistance, gloss and other properties. Historically, facestock material of thicknesses greater than about 3 mils have been used in order to assure dispensability in automatic labeling apparatuses. However, it is desirable to reduce the thickness or "down-gauge" the facestock material in order to attain savings in material costs. Such reduction in label thickness often has resulted in reduced stiffness and the inability to dispense the labels in a reliable commercially acceptable manner using automatic machinery.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. The release level also is dependent upon the stiffness of the facestock. Failure to dispense may also be characterized by the wrinkling of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

Recently, to achieve the cost savings afforded by down-gauged film, polymeric materials which have been suggested in the prior art as useful in preparing labels include polymeric biaxially-oriented polypropylene ("BOPP") of thicknesses down to about 2.0 mils which is relatively inexpensive and dispenses well. Such films tend to have sufficient stiffness for dispensing, but they also generally have unacceptable conformability characteristics. When the biaxially-oriented films are applied to rigid substrates such as glass bottles, the application is not completely successful due to the tendency of the relatively stiff label to bridge surface depressions and mold seams resulting from bottle-forming processes which results in an undesirable surface appearance simulating trapped air bubbles. This has impeded the use of pressure-sensitive adhesive labels to replace prior glass bottle labeling techniques such as ceramic ink directly bonded to the bottle surface during glass bottle manufacturing processes, Such ceramic ink techniques are environmentally undesirable due to objectionable ink components and the contamination by the ink of the crushed bottle glass in recycling processing.

Other useful materials are unoriented polyethylene and polypropylene films that are also relatively inexpensive and conformable. However, both of these films are difficult to die-cut and do not dispense well at low calipers.

It is also desirable in some instances to use labels which are clear and essentially transparent on glass bottles. Many facestocks currently available for labels lack sufficiently low levels of opacity and haze to qualify for such uses. Resinous film-forming materials which are blends of "soft" polar additives ("SPA") such as ethylene vinyl acetate copolymer (EVA) with low-cost oleic base materials such as polypropylene, polyethylene, or combinations thereof including propylene-ethylene copolymers, blends of polyethylene and polypropylene with each other, or blends of either or both of them with polypropylene-polyethylene copolymer have been suggested as useful in preparing die-cut labels. In U.S. Pat. No. 5,186,782, extruded heat-set polymeric films are described which are die-cut into labels and applied to deformable or squeezable workpieces after being treated differently in their lengthwise and cross directions so as to have different stiffness in the respective directions. The polymeric films described in the '782 patent include heat-set unilayer films, and specifically films of polyethylene, as well as multilayer films which may comprise a coextrudate including an inner layer, a skin layer on the face side of the coextrudate, and optionally a skin layer on the inside of the coextrudate opposite the face side. A pressure-sensitive adhesive layer is generally applied to the inner side of the coextrudate. Preferred materials disclosed for use in the skin and inner layers comprise physical blends of (1) polypropylene or copolymers of propylene and ethylene and (2) ethylene vinyl acetate (EVA) in weight ratios ranging from 50/50 to 60/40. The core material also may be polyethylene of low, medium or high density between about 0.915 and 0.965 specific gravity. Films made of olefin-SPA blends have too high a haze for use on certain glass bottle substrates.

The machine-direction-oriented labels of the present invention are to be contrasted with shrink-films consisting of stretched, unannealed films. Examples of such shrink film labels are found in U.S. Pat. Nos. 4,581,262 and 4,585,679. The tendency to shrink causes such film to tend to withdraw from any borders leaving exposed adhesive. The exposed adhesive presents a particular disadvantage in die-cut label applications since the exposed adhesive is unsightly and tends to catch dust.

SUMMARY OF THE INVENTION

This invention relates to a film comprising a machine direction oriented polymeric film prepared from (A) at least one propylene homopolymer, propylene copolymer or blend of two or more thereof, wherein (A) has a melt flow rate from about 5 to about 40 and (B) an olefin elastomer, wherein (A) is not the same as (B). In one embodiment, the film is nucleated. In one embodiment, the films are clear. In another embodiment, the films have good stiffness and clarity with low haze. The films are useful in preparing labels and may be used as a monolayer film or in a multilayer film. In one embodiment, the films are printable.

Die-cut labels are also described which comprise a composite comprising the extruded, machine-direction oriented polypropylene copolymer films of the present invention in combination with an adhesive associated with said copolymer films for adhering said label to a substrate.

Multilayer composites also are described which comprise a label facestock material comprising an extruded oriented multilayer film of the present invention, an adhesive layer associated with said facestock material, and a release-coated liner or carrier. The labels of the present invention may be joined with layer of adhesive to a substrate such as glass bottles or deformable substrates like squeezable bottles.

DETAILED DESCRIPTION OF THE PREFERRED EMBODIMENTS

Figure 1:
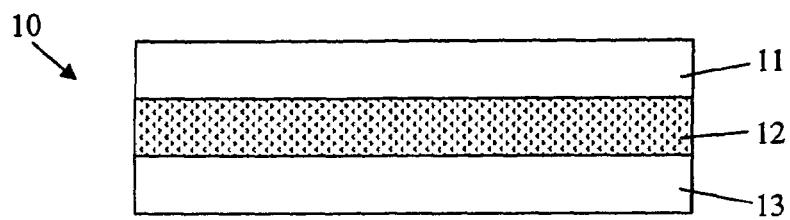
FIG. 1 is a cross sectional view of a label prepared with a monolayer film of the present invention.

The films of the present invention are derived from a combination of (A) at least one propylene homopolymer, propylene copolymer or blend of two or more thereof and (B) at least one olefin elastomer, provided that (A) and (B) are not the same. The films may be used as a monolayer film or as one or more parts of a multilayer film. In one embodiment, the films are clear, even crystal clear. In one embodiment, the films have a haze of less than 10%. Haze is measured in the BYK Gardner hazemeter. The oriented propylene films of the present invention have an opacity of about 10% or less.

(A) Propylene Polymers

The present invention relates to films prepared from propylene polymers. The films are prepared from (A) at least one propylene homopolymer, propylene copolymer or blend of two or more thereof, wherein (A) has a melt flow rate from about 5 to about 40, or from about 6 to about 32, or from about 6 to about 30, or from about 8 to about 25. The melt flow rate is determined by ASTM test D-1238. In one embodiment, the melt flow rate of the polymer (A) is from about 8 to about 26, or from about 10 to about 22. Here and elsewhere in the specification and claims, the range and ratio limits may be combined.

As noted above, the machine direction oriented film comprises (A) at least one propylene homopolymer, copolymer, or a blend of two or more thereof. In one embodiment, (A) is generally present in an amount from about 40% to about 98%, or from about 45% to about 90%, or from about 50% to about 85%, or from about 55% to about 80% by weight of the polymers in the film. In one embodiment, (A) is a blend of two or more polymers having the melt flow described herein. The blend can comprise a blend of two or more propylene homopolymers, a blend of a propylene homopolymer and a propylene copolymer, a blend of two or more propylene homopolymers with a propylene copolymer, or a blend of two or more propylene copolymers with a propylene homopolymer.

In one embodiment, the propylene films (A) may be nucleated. These films may contain one or more nucleating agents. In a particularly useful embodiment, the nucleating agent is blended into the propylene polymers (A). Various nucleating agents can be incorporated into the film formulations of the present invention, and the amount of nucleating agent added should be an amount sufficient to provide the desired modification of the crystal structure while not having an adverse effect on the desired optical properties of the film. It is generally desired to utilize a nucleating agent to modify the crystal structure and provide a large number of considerably smaller crystals or spherulites to improve the transparency (clarity) of the film. The amount of nucleating agent added to the film formulation should not have a deleterious affect on the clarity of the film. The amounts of nucleating agent incorporated into the film formulations of the present invention are generally quite small and range from about 500, or from about 750 or from about 850 ppm. The nucleating agents may be present in an amount up to 5000, or up to about 3000, or up to about 1000.

Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Wijga in U.S. Pat. Nos. 3,207,735, 3,207,736, and 3,207,738, and Wales in U.S. Pat. Nos. 3,207,737 and 3,207,739, all patented Sep. 21, 1966, suggest that aliphatic, cycloaliphatic, and aromatic carboxylic, dicarboxylic or higher polycarboxylic acids, corresponding anhydrides and metal salts are effective nucleating agents for polyolefin. They further state that benzoic acid type compounds, in particular sodium benzoate, are the best embodiment of the nucleating agents.

In one embodiment, the nucleating agents are sorbitol derivatives or organic phosphates. Substituted sorbitol derivatives such as bis (benzylidene) and bis (alkylbenzilidine) sorbitols wherein the alkyl groups contain from about 2 to about 18 carbon atoms are useful nucleating agents.

More particularly, sorbitol derivatives such as 1,3,2,4-dibenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

Other acetals of sorbitol and xylitol are typical nucleators for polyolefins and other thermoplastics as well. Dibenzylidene sorbitol (DBS) was first disclosed in U.S. Pat. No. 4,016,118 by Hamada, et al. as an effective nucleating and clarifying agents for polyolefin. Since then, large number of acetals of sorbitol and xylitol have been disclosed. Representative US patents include: Kawai, et al., U.S. Pat. No. 4,314,039 on di(alkylbenzylidene) sorbitols; Mahaffey, Jr., U.S. Pat. No. 4,371,645 on di-acetals of sorbitol having at least one chlorine or bromine substituent; Kobayashi, et al., U.S. Pat. No. 4,532,280 on di(methyl or ethyl substituted benzylidene) sorbitol; Rekers, U.S. Pat. No. 5,049,605 on bis(3,4-dialkylbenzylidene) sorbitols including substituents forming a carbocyclic ring. These patents are hereby incorporated by reference. These patents are hereby incorporated by reference.

Another class of nucleating agents described by Nakahara, et al. in U.S. Pat. No. 4,463,113, in which cyclic bis-phenol phosphates was disclosed as nucleating and clarifying agents for polyolefin resins. Kimura, et al. then describes in U.S. Pat. No. 5,342,868 that the addition of an alkali metal carboxylate to basic polyvalent metal salt of cyclic organophosphoric ester can further improve the clarification effects of such additives. Compounds that are based upon this technologies are marketed under the trade name NA-11 and NA-21. These patents are hereby incorporated by reference.

A number of useful propylene homopolymers are available commercially from a variety of sources. Some of the useful homopolymers are listed and described in the following Table I.

TABLE I

Commercial Propylene Homopolymers

| Commercial Designation | Company | Melt Flow g/10 min | Density (g/cm3) |
|---|---|---|---|
| 5390N | Dow Chemical | 12.0 | 0.90 |
| SE66R | Dow Chemical | 8.8 | 0.90 |
| 3622 | Atofina | 12.0 | 0.90 |
| 3576X | Atofina | 9.0 | 0.90 |
| Moplen HP400N | Basell | 12.0 | 0.90 |
| P4G4K-038* | Huntsman | 12 | 0.90 |
| 9074*MED | Exxon Mobil | 24 | 0.90 |

*contains a nucleating agent

In another embodiment, (A) may be a propylene copolymer. Propylene copolymers generally comprise polymers of propylene and up to about 40% by weight of at least one alpha-olefin selected from ethylene and alpha-olefins containing from 4 to about 12, or from 4 to about 8 carbon atoms. Examples of useful alpha-olefins include ethylene, 1-butene, 1-pentene, 4-methyl-1-pentene, 1-hexene, 1-heptene, and 1-octene. In one embodiment, the polymers of propylene which are utilized in the present invention comprise polymers of propylene with ethylene, 1-butene, 1-hexene or 1-octene. The propylene alpha-olefin polymers useful in the present invention include random as well as block copolymers although the random copolymers generally are particularly useful. In one embodiment, the films are free of impact copolymers. Blends of two or more propylene copolymers as well as blends of the propylene copolymers with propylene homopolymers can be utilized.

In one embodiment, the propylene copolymers are propylene-ethylene copolymers with ethylenic contents from about 0.2% to about 10% by weight. In another embodiment, the ethylene content is from about 3% to about 10% by weight, or from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-hexene copolymers may contain up to about 35% by weight 1-hexene. In one embodiment, the amount of 1-hexene is up to about 25% by weight. Propylene-1-octene copolymers useful in the present invention may contain up to about 40% by weight of 1-octene. More often, the propylene-1-octene copolymers will contain up to about 20% by weight of 1-octene.

A list of some useful commercially available propylene copolymers is found in the following Table II.

TABLE II

Commercial Propylene Copolymers

| Commercial Name | Source | Melt Flow Rate (g/10 mins) |
|---|---|---|
| DS6D21 | Dow Chemical | 8.0 |
| KB4560 | BP Amoco | 10 |
| KB4586 | BP Amoco | 10 |
| KB4986 | BP Amoco | 30 |
| 9433* | BP Amoco | 12 |
| 13T25A | Huntsman | 25 |
| P5M4K-046* | Huntsman | 10 |
| P5M5K-047 | Huntsman | 20 |

*contains nucleating agent

In one embodiment, the propylene copolymer contains a nucleating agent as described above for the propylene homopolymer.

The propylene copolymers useful in preparing the film facestock of the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts. In one embodiment, the propylene polymer (A) are free of antistatic agents.

(B) Olefin Elastomers

As described herein, the film compositions include (B) at least one olefin elastomer. Olefin elastomers have been referred to as plastomers. In one embodiment, the olefin elastomers have a melt flow index from about 1 to about 40, or from about 3 to about 35, or from about 5 to about 25 g/10 min. The melt flow index is determined by ASTM test D-1238 at 190 degrees C. In one embodiment, the melt flow indix for (B) is in the range from about 1 to about 25, or from about 2 to about 10 g/10 min. The olefin elastomer is typically present in an amount from about 2% to about 55%, or from about 10% to about 50%, or from about 15% to about 45% of the polymers in the film.

In one embodiment, the olefin elastomers (B) typically have a molecular weight distribution (Mw/Mn) of about 1.5 to 2.4, where Mw is weight average molecular weight and Mn is number average molecular weight. In one embodiment, the olefin elastomers have a density of about 0.82 to about 0.98, or of about 0.84 to about 0.97, or of about 0.86 to about 0.91 g/cc, or of about 0.87 g/cc to about 0.91 g/cc. In another embodiment, the olefin elastomers have a molecular weight of about 5,000 to about 50,000, or of about 20,000 to about 30,000.

The olefin elastomers include polyolefin polymers which exhibit both thermoplastic and elastomeric characteristics. The polymers include copolymers and terpolymers of ethylene or propylene with an alpha-olefin. The polymer typically comprises from about 2% to about 30%, or from about 5% to about 25%, or from about 10% to about 20% by weight of the alpha-olefin. The alpha olefins have been described above. The alpha olefins include 1-butene, 1-pentene, 1-hexene, 1-heptene, 1-octene, 1-nonene, 1-decene, and 1-dodecene. Particularly useful alpha olefins include 1-butene and 1-hexene. Olefin elastomers include but are not limited to ethylene-butene copolymers, ethylene-octene copolymers, ethylene-hexene copolymers, and ethylene-hexene-butene terpolymers, as well as mixtures thereof.

In another embodiment, the olefin elastomers which may be employed in the invention include copolymers of ethylene and at least one $C_3$-$C_{20}$ alpha-olefin, or a $C_4$-$C_8$ alpha-olefin present in an amount of about 5 to about 32 mole %, or of about 7 to about 22 mole %, or of about 9 to about 18 mole %.

For example, the copolymers may be obtained by copolymerization of ethylene or propylene with an alpha olefin, such as 1-butene, using single-site metallocene catalysts. Such copolymers are available from Exxon Mobil Chemical Company, Basell and Dow Chemical Company. Another useful propylene and 1-butene copolymer is available commercially from Basell under the trade designation EP3C30HF. This copolymer has 14% butylene and a melt flow index of about 5.5 g/10 min.

Non-limiting examples of olefin elastomers include linear ethylene-butene copolymers such as EXACT 3024 having a density of about 0.905 gms/cc (ASTM D-1505) and a melt index of about 4.5 g/10 min. (ASTM D-1238); EXACT 3027 having a density of about 0.900 gms/cc (ASTM D-1505) and a melt index of about 3.5 g/10 min. (ASTM D-1238); EXACT 4011 having a density of about 0.888 gms/cc (ASTM D-1505) and a melt index of about 2.2 g/10 min. (ASTM D-1238); and EXACT 4049 having a density of about 0.873 gms/cc (ASTM D-1505) and a melt index of about 4.5 g/10 min. (ASTM D-1238); and ethylene-hexene copolymers such as EXACT 4150 having a density of about 0.895 gms/cc (ASTM D-1505) and a melt index of about 3.5 g/10 min. (ASTM D-1238). Other non-limiting examples of useful EXACT plastomers are EXACT 3017 and EXACT 4053. Terpolymers of e.g. ethylene, butene and hexene also can be used. All of the above EXACT series plastomers are available from EXXON Chemical Co.

Examples of terpolymers are Exxon's Exact 3006 (an ethylene-butene-hexene terpolymer with a density of 0.910 g/cm$^3$ (g/cc) and M.F.I. of 1.2 g/10 min (g/10')); Exact 3016 (an ethylene-butene-hexene terpolymer having a density of 0.910 g/cm$^3$ (g/cc) and a M.F.I. of 4.5 g/10 min (g/10')); Exact 3033 (an ethylene-butene-hexene terpolymer having a density of 0.900 g/cm$^3$ (g/cc) and a M.F.I. of 1.2 g/10 min (g/10')); Exact 3034 (an ethylene-butene-hexene terpolymer having a density of 0.900 g/cm$^3$ (g/cc) and a M.F.I. of 3.5 g/10 min (g/10')); Dow Affinity PL 1840 (an ethylene-propylene-butylene terpolymer); Dow Affinity PL 1845 (an ethylene-propylene-butylene terpolymer); Dow Affinity PL 1850 (an ethylene-propylene-butylene terpolymer); and Exxon Mobil ZCE 2005 (an ethylene-propylene-butylene terpolymer).

In one embodiment, EXACT plastomers independently have a molecular weight distribution (Mw/Mn) of about 1.5 to 2.4, where Mw is weight average molecular weight and Mn is number average molecular weight, a density of about 0.86 to about 0.91 g/cc, or about 0.87 g/cc to about 0.91 g/cc, a molecular weight of about 5,000 to about 50,000, or about 20,000 to about 30,000, a melting point of about 140-220 F., and a melt flow index above about 0.50 g/10 mins, or about 1-10 g/10 mins as determined by ASTM D-1238, condition E.

Plastomers such as those sold by Dow Chemical Co. under the tradename Affinity also may be employed in the invention. These plastomers are believed to be produced in accordance with U.S. Pat. No. 5,272,236, the teachings of which are incorporated herein in their entirety by reference. In one embodiment, these plastomers are substantially linear polymers having a density of about 0.85 gms/cc to about 0.97 g/cc measured in accordance with ASTM D-792, a melt index ("MI") of about 0.01 gms/10 minutes to about 1000 grams/10 minutes, a melt flow ratio (I10/I2) of about 7 to about 20, where I10 is measured in accordance with ASTM D-1238 (190/10) and I2 is measured in accordance with ASTM D-1238 (190/2.16), and a molecular weight distribution Mw/Mn which or is less than 5, and or is less than about 3.5 and or is from about 1.5 to about 2.5. These plastomers include homopolymers of C2-C20 olefins such as ethylene, propylene, 4-methyl-1-pentene, and the like, or they can be interpolymers of ethylene with at least one C3-C20 alpha-olefin and/or C2-C20 acetylenically unsaturated monomer and/or C4-C18 alpha-olefins. These plastomers generally have a polymer backbone that is either unsubstituted or substituted with up to 3 long chain branches/1000 carbons. As used herein, long chain branching means a chain length of at least about 6 carbons, above which the length cannot be distinguished using 13 C nuclear magnetic resonance spectroscopy. Useful Affinity plastomers are characterized by a saturated ethylene-octene backbone, a narrow molecular weight distribution Mw/Mn of about 2, and a narrow level of crystallinity. These plastomers also are compatible with pigments, brightening agents, fillers such as carbon black, calcium carbonate and silica, as well as with plasticizers such as paraffinic process oil and naphthenic process oil. Other commercially available plastomers may be useful in the invention, including those manufactured by Mitsui.

In one embodiment, the molecular weight distribution, (Mw/Mn), of plastomers made in accordance with U.S. Pat. No. 5,272,236 is about 2.0. Non-limiting examples of these plastomers include Affinity PF 1140 having a density of about 0.897 gms/cc, and a melt flow index of about 0.5 g/10 mins; Affinity PF 1146 having a density of about 0.90 gms/cc, and a melt index of about 1 gms/10 min; Affinity PL 1880 having a density of about 0.902 gms/cc, and melt index of about 1.0 gms/10 min; Affinity EG 8100 having a density of about 0.87 gms/cc, and a melt index of about 1 gms/10 min.; Affinity EG 8150 having a density of about 0.868 gms/cc, and a melt index of about 0.5 gms/10 min,; Affinity EG 8200 having a density of about 0.87 gms/cc, and a melt index of about 5 g/10 min.; and Affinity KC 8552 having a density of about 0.87 gms/cc, and a melt index of about 5 g/10 min.

In one embodiment, the olefin elastomers include those formed by a single-site metallocene catalyst such as those disclosed in EP 29368, U.S. Pat. Nos. 4,752,597, 4,808,561, and 4,937,299, the teachings of which are incorporated herein by reference. As is known in the art, plastomers can be produced by metallocene catalysis using a high pressure process by polymerizing ethylene in combination with other monomers such as butene-1, hexene-1, octene-1 and 4-methyl-1-pentene in the presence of catalyst system comprising a cyclopentadienyl-transition metal compound and an alumoxane.

(C) Nucleating Agents

In one embodiment, the films include a nucleating agent. The nucleating agents are described above. The nucleating agents may be incorporated in any or all of the layers of the multilayer films of the invention. As described above, the nucleating agent maybe incorporated into propylene polymer (A) or as a separate component of the formulation used to make the film. Nucleating agents may also be pre-compounded in propylene polymer (A) or olefin elastomer (B) and added as a separate component of the film formulation. Generally, the total amount of nucleating agent incorporated into the film formulations of the present invention are generally quite small and range from about 500 or 1000 to 3000 or 5000 ppm. The amount of nucleating agent may be evenly or unevenly divided between being pre-compounded in (A) or (B) and present as a separate component (C).

The monolayer and multilayer films of the present invention may also contain antiblocking agents. The addition of antiblocking agents to the film formulations reduces the tendency of the films to block during windup, regulates the slip and anti-static properties of the films and allows a smooth unwinding from the reels. Any of the antiblocking agents described in the prior art as useful additives modifying the properties of polymer films, and in particular, olefin polymer films, can be included in the film formulations of the present invention. Silicas with average particle sizes of about 2 microns or less can be utilized for this purpose, and only small amounts (for example, 1000 to 5000 ppm) of the fine silica are needed. Several antiblocking agents based on synthetic silica are available from A. Schulman, Inc., Akron, Ohio, under the general trade designation Polybatch®. These materials are antiblocking masterbatches and comprise free-flowing pellets comprising propylene homopolymers or copolymers and the synthetic silica. For example, Polybatch ABPP-05 comprises 5% synthetic silica in a propylene homopolymer; ABPP-10 comprises 10% synthetic silica in a propylene homopolymer; and ABPP-05SC comprises 5% synthetic silica and a random propylene copolymer. When the antiblocking agents are to be utilized in the preparation of the multilayer films of the present invention, the antiblocking agent generally is added to the skin layer formulations only. Useful antiblocking agents are Ampacet's Seablock 1 and Seablock 4.

In another embodiment, the film compositions contain at least one processing aid. The processing aid acts to facilitate extrusion. These processing aids include hexafluorocarbon polymers. An example of a commercially available processing aid that can be used is Ampacet 10919 which is a product of Ampacet Corporation identified as a hexafluoro carbon polymer. Another example of a useful processing aid is Ampacet 401198. The processing aids are typically used at concentrations of up to about 1.5% or form about 0.5% to about 1.2% by wight. In another embodiment, the processing aid is present in an amount up to about 0.25% by weight, and in one embodiment about 0.03% to about 0.15% by weight.

The films may be prepared by means known to those in the art. For instance the films may be prepared by extrusion. Typically the films are extruded at temperatures between 250 to about 550, or about 300 to about 500 degrees F. A useful procedure for preparing the films is extrusion at 450 degrees F.

The following examples relate to polymer compositions which can be used to prepare the polymeric films. Unless otherwise indicated, amounts are in parts by weight, temperature is in degrees Celsius and pressure is ambient pressure.

TABLE III

|  | 1 | 2 | 3 | 4 | 5 | 6 | 7 | 8 | 9 | 10 | 11 | 12 |
|---|---|---|---|---|---|---|---|---|---|---|---|---|
| Huntsman propylene homopolymer P4G4K-038# (MFR 12) | 50 | — | — | — | — | 60 | 65 | — | — | — | 15 | 65 |
| Huntsman propylene copolymer P5M4K-046# (MFR 10) | — | 65 | — | — | 90 | — | — | — | — | — | — | — |
| BP Amoco propylene copolymer KB4986 (MFR 30) | — | — | 55 | — | — | — | — | 65 | — | 52 | — | — |
| Dow propylene copolymer D56D21 (MFR 8) | — | — | — | 80 | — | — | — | — | 65 | — | 50 | — |
| Exact 3025 olefin elastomer (MFI 1.2) | — | — | 45 | — | — | — | 10 | — | — | — | — | 20 |
| Exact 4049 olefin elastomer (MFI 4.5) | — | 35 | — | — | 10 | 40 | — | 35 | 35 | 48 | — | 15 |
| Affinity 8500 olefin elastomer (MFI 5.0) | 50 | — | — | 20 | — | — | 25 | — | — | — | 35 | — |
| Sodium benzoate Nucleating agent | 0.1 | 0.1 | 0.1 | 0.1 | 0.1 | 0.1 | 0.1 | 0.1 | 0.1 | 0.1 | 0.1 | 0.1 |
| calcium stearate | 0.1 | 0.1 | 0.1 | 0.1 | 0.1 | 0.1 | 0.1 | 0.1 | 0.1 | 0.1 | 0.1 | 0.1 |

|  | 13 | 14 | 15 | 16 | 17 | 18 | 19 | 20 | 21 | 22 |
|---|---|---|---|---|---|---|---|---|---|---|
| Huntsman propylene homopolymer P4G4K-038# (MFR 12) | 25 | — | — | 88 | — | 60 | — | — | 15 | 35 |
| Huntsman propylene copolymer P5M4K-046# (MFR 10) | — | 65 | — | — | 87.5 | — | — | 60 | — | 25 |
| BP Amoco propylene copolymer 9433 (MFR 12) | 25 | — | 54.5 | — | — | — | 65 | — | 60 | — |
| Exact 3025 olefin elastomer (MFI 1.2) | — | 15 | 45 | — | — | 37.5 | — | — | — | 20 |
| Exact 4049 olefin elastomer (MFI 4.5) | — | 20 | — | — | 10 | — | 42.5 | 37.5 | — | 17.5 |
| Affinity EG 8500 olefin elastomer (MFI 5.0) | 50 | — | — | 20 | — | — | — | — | 37.5 | — |
| Miladd 3988 (Nucleating agent)& | no | no | yes | no | no | no | yes | no | no | no |
| Polybatch ABPP 05SC | 2 | 2 | 2 | 2 | 2 | 2 | 2 | 2 | 2 | 2 |
| Processing aid | 0.5 | 0.5 | 0.5 | 0.5 | 0.5 | 0.5 | 0.5 | 0.5 | 0.5 | 0.5 |

TABLE III-continued

|  | 23 | 24 | 25 | 26 | 27 | 28 | 29 | 30 | 31 | 32 |
|---|---|---|---|---|---|---|---|---|---|---|
| Huntsman propylene homopolymer P4G4K-038# (MFR 12) | 25 | — | — | 88 | — | — | — | — | 15 | 35 |
| Huntsman propylene copolymer P5M4K-046# (MFR 10) | — | 65 | — | — | 87.5 | 65 | — | 65 | — | 25 |
| Exact 3025 olefin elastomer (MFI 1.2) | — | 15 | 45 | — | — | — | — | — | — | 20 |
| Exact 4151 olefin elastomer (MFI 2.2) | 50 | 20 | — | 20 | 10 | 35 | 42.5 | 35 | 37.5 | 17.5 |
| Miladd 3988 (Nucleating agent)& | no | no | yes | no | no | yes | yes | no | no | no |
| Polybatch ABPP 05SC | 2 | 2 | 2 | 2 | 2 | 2 | 2 | 2 | 2 | 2 |
| Processing aid | 1 | 1 | 1 | 1 | 1 | 1 | 1 | 1 | 1 | 1 | film is free of anti-static agent.
&nucleating agent at 1900 ppm as added ingredient (not pre-compounded in a resin).

Films and Constructions

As described herein, the above films may be used alone as a monolayer film or in combination with other films to make a multilayer film construction. In multilayer constructions, the whole construction may be made from the films of the present invention. In another embodiment, the films of the present invention compose at least one of the layers of a multilayer film construction. In another embodiment, the films of the present invention compose at least one skin layer of a multilayer construction.

In one embodiment, the polymers of the machine direction oriented films are only hydrocarbon polymers. In another embodiment, the film compositions contain less that 1% polar components or are free of polar components. Polar components are derived from polar monomers and include acylate esters, vinyl acetate, and the like. In one embodiment, the films are not derived from vinyl acetate. In another embodiment, the films are free of polymers derived from a vinyl halide, an acrylic or methacrylic acid or ester, acrylonitrile, or acrylamide. In another embodiment, the films are free of styrene based rubbers. In another embodiment, the core layers contain less that 5%, or less than 1% or are free of fillers. In another embodiment, the film is substantially free of voids.

The thickness of the films will range from about 0.5 mils (12.5 microns) to about 10 mils (250 microns) depending upon the anticipated utility of the film. More often, however, the films of the present invention will have a thickness of less than 7 mils (178 microns). Film thicknesses of from about 1 to about 6 mils (25 to 150 microns), more often from about 1 to about 4 mils (25 to 100 microns) and most often from about 1.5 to about 2.5 mils (37.5 to 62.5 microns) are particularly useful for preparing labels. The films are machine direction oriented films. These films are oriented as is known to those in the art and described herein. The films typically have a stretch ratio of 9 or less, or between 2 and 8, and or at about 4 to 7. In one embodiment, the films are machine-direction oriented at a stretch ratio of about 7 or less generally have a total thickness (caliper) of less than about 4 mils and more often, a caliper of about 3 mils or less such as in the range of about 2.0 to about 3.0 mils.

As described herein the films may be used in label construction. The labels are particularly useful for deformable substrate such as squeezable and semi-squeezable bottles. The label are conformable to the surface of the substrate and rarely form bubbles during application. The labels have good adhesion properties and generally do not delaminate. FIG. 1 illustrates a cross section of a label using a monolayer film of the present invention and an adhesive. Label 10 has film layer 11 which is adhered to adhesive layer 12. Optionally, adhesive layer 12 would be releasably adhered to a liner or carrier layer 13. The liner or carrier layer 13 is optional. When the label is an in-mold label then liner layer 13 would not be present.

The adhesive layer 12 may be directly coated on the lower surface of the film layer 11, or the adhesive may be transferred from a liner 13 with which the film is combined. Typically, the adhesive layer has a thickness in the range of from about 0.1 to about 2 mils (2.5 to 50 microns). Adhesives suitable for use are those commonly available in the art. Generally, these adhesives include pressure-sensitive adhesives, heat-activated adhesives, hot melt adhesives, and the like. Pressure-sensitive adhesives are particularly useful. These include acrylic adhesives as well as other elastomers such as natural rubber or synthetic rubbers containing polymers or copolymers of styrene, butadiene, acrylonitrile, isoprene and isobutylene. Pressure sensitive adhesives include acrylic based, silicone based and rubber based pressure sensitive adhesives. Pressure-sensitive adhesives are well known in the art and any of the known adhesives can be used with the facestocks of the present invention. In one embodiment, the pressure-sensitive adhesives are based on copolymers of acrylic acid esters, such as, for example, 2-ethyl hexyl acrylate, with polar comonomers such as acrylic acid.

In the manufacture of labelstock from monolayer and multilayer films in accordance with the invention, liner or carrier stock may be provided. The liner or carrier stock may comprise a multilayer liner made for example as disclosed in U.S. Pat. No. 4,713,273, the disclosure which is incorporated herein by reference, or may be a conventional liner or carrier consisting of a single paper of film layer which may be supplied in roll form. If it has not been previously provided with a release coating and does not itself include components to inherently generate a release surface at its adhesive-contacting face, the liner or carrier may be coated with a release coating (e.g., a silicone). If a release coating is applied, it is dried or cured following application by any suitable means.

The release face of the release liner or carrier may be coated with a layer of pressure-sensitive adhesive for subsequent transfer of the adhesive to the labelstock with which the liner or carrier is employed. When the labelstock is combined with the liner or carrier, the adhesive is joined to the film. Later, the liner or carrier is removed to expose the adhesive, and the adhesive remains permanently joined to the film.

In some applications, the adhesive layer may be a heat-activated adhesive or a hot-melt adhesive such as used in in-mold label applications, as distinguished from a pressure-sensitive adhesive. If the adhesive is a heat-activated adhesive or a hot-melt adhesive, there may be no need for the provision of a release liner for inherent releasability such as is required when using a pressure-sensitive adhesive.

In another embodiment, the film of the present invention is at least one layer of a multilayer film construction. The films may be interior layer such as core, base or inner layer, or may constitute a dividing layer, such as a layer separating two core layers. The films may also be an exterior layer which is typically referred to as a skin layer. Of course it is understood that the films of the present invention may compose both the inner and outer layers of the multilayer construction.

Figure 2:
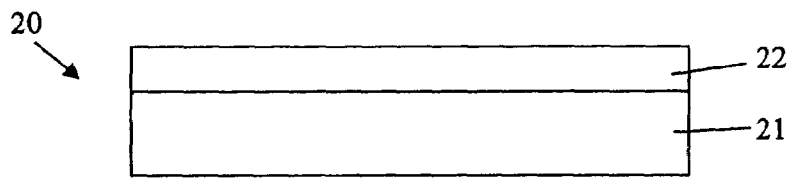
FIG. 2 is a cross sectional view of a multilayer film of the present invention.

Referring to FIG. 2, a multilayer film 20 is illustrated. Multilayer film 20 has a base or core layer 21 having an upper and lower surface. Skin layer 22 covers the upper surface of base layer 21. The multilayer film 20 may be formed by coextrusion of layers 21 and 22 or by laminating the layers together, as is known to those in the art. The layers of the coextrudate of FIG. 2 may be formed by simultaneous extrusion from a suitable known type of coextrusion die, and are adhered to each other in a permanently combined state to provide a unitary coextrudate.

The base or inner layer is relatively thick compared to the skin layer or layers. Thus, the inner layer may be about 2 to 20 times as thick as each of the skin layers. Examples of thickness ratios for two layer films such as represented in FIG. 2 include 90:10, 85:15; 80:20, 70:30 etc. In one embodiment, when the core layer has one skin layer, the skin layer comprises from about 0.5% to about 20%, or from about 1% to about 15%, or from about 2% to about 12% of the thickness of the multilayer film.

Figure 3:
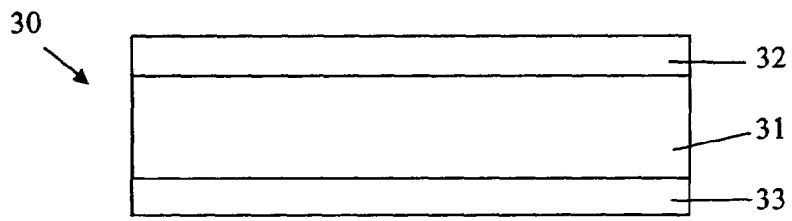
FIG. 3 is a cross sectional view of a multilayer film of the present invention.

FIG. 3 illustrates a multilayer film having a base or core layer 31 which has an upper and lower surface. Skin layer 32 covers the upper surface of the base layer 31, and skin layer 33 covers the lower surface of the base layer 31. This multilayer film may be prepared in the manner described for the two layer film illustrated in FIG. 2. Thickness ratios for the three layered films such as shown in FIG. 3 include 5:90:5, 10:80:10, 15:70:15, 20:60:20, etc. The two skin layers do not have to be of equal thickness. When the core layer has two skin layers, the skin layers comprise from about 2% to about 35%, or from about 5% to about 25%, or from about 8% to about 20% of the thickness of the multilayer film.

Figure 4:
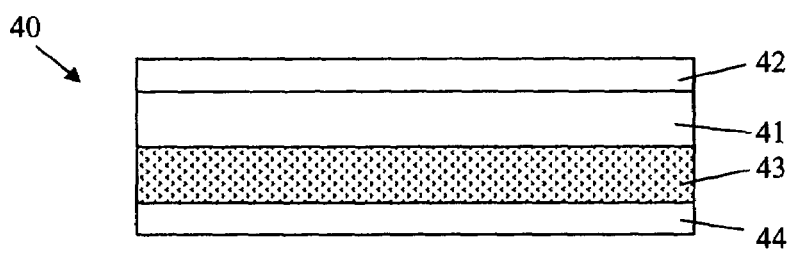
FIG. 4 is a cross sectional view of a label prepared with a multilayer film of the present invention.

The multilayer films may be used in label constructions. Referring to FIG. 4, label 40 have a base or inner layer 41 with an upper and lower surface. The upper surface of base layer 41 is covered by skin layer 42. The lower surface of base layer 41 is adhered to adhesive layer 43, which in turn may optionally be releasably adhered to liner 44. If the label is an in-mold label, for instance, then the liner 44 is not present.

Figure 5:
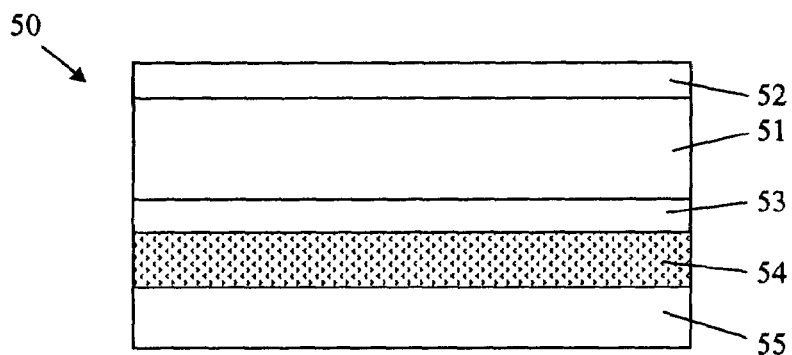
FIG. 5 is a cross sectional view of a label prepared with a multilayer film of the present invention.

Referring to FIG. 5, label 50 has a base or inner layer 51 with an upper and lower surface. The upper surface of base layer 51 is covered by skin layer 52. The lower surface of base layer 51 covered by skin layer 53. Skin layer 53 is adhered to adhesive layer 54, which in turn is optionally releasably adhered to liner 55. If the label is an in-mold label, for instance, then the liner 55 is not present.

As described herein, the layer of the labels and films may be composed of the above described film compositions. In one embodiment, the base or inner layer is a nucleated propylene film.

In another embodiment, the skin layer of the multilayer film are those from the above described films. In this embodiment, the base or inner layer comprises a polyethylene having a density above 0.94 g/cm³, a propylene homopolymer or copolymer, or a blend of a propylene homopolymer and at least one propylene copolymer. In one embodiment, the blends of homopolymers and copolymers in the base layer may comprise from about 5% to about 95% of the homopolymer and correspondingly from about 95% to about 5% by weight of the copolymer. The propylene homopolymers which may be utilized as the base material either alone or in combination with a propylene copolymer as described herein, include a variety of propylene homopolymers such as those having melt flow rates (MFR) from about 1 to about 20 as determined by ASTM Test D1238, condition L. The propylene homopolymers have been described above. In one embodiment, propylene homopolymers having MFRs of at least about 4 (or at least about 8) are particularly useful and provide facestocks having improved die-cuttability. Useful propylene homopolymers also may be characterized as having densities in the range of about 0.88 to about 0.92 g/cm3.

In one embodiment, the core comprises a polyethylene having a density above 0.94 g/cm³, a propylene homopolymer or copolymer, or a blend of a propylene homopolymer and at least one propylene copolymer and from about 1% to about 15%, or from about 3% to about 10%, or about 4% to about 7% by weight of one or more of the above described olefin elastomers.

A number of useful propylene homopolymers are available commercially from a variety of sources. Some of the useful homopolymers are listed and described in the following Table IV.

TABLE IV

Commercial Propylene Homopolymers

| Commercial Designation | Company | Melt Flow g/10 min | Density (g/cm3) |
| --- | --- | --- | --- |
| 5A97 | Dow Chemical | 3.9 | 0.90 |
| Z9470 | Atofina | 5.0 | 0.89 |
| Z9470HB | Atofina | 5.0 | 0.89 |
| 3272 | Atofina | 1.8 | 0.89 |

The propylene copolymers useful in the core have been describe above. In one embodiment, the propylene copolymers which may be utilized in the base or inner layer generally comprise copolymers of propylene and up to about 40% by weight of at least one alpha-olefin selected from ethylene and alpha-olefins containing from 4 to about 12, or from about 4 to about 8 carbon atoms.Examples of useful alpha-olefins include ethylene, 1-butene, 1-pentene, 4-methyl-1-pentene, 1-hexene, 1-heptene, and 1-octene. More often, the copolymers of propylene which are utilized in the present invention comprise copolymers of propylene with ethylene, 1-butene or 1-octene. The propylene alpha-olefin copolymers useful in the present invention include random as well as block copolymers although the random copolymers generally are particularly useful. Blends of the copolymers as well as blends of the copolymers with propylene homopolymers can be utilized as the composition for the base layer. In one embodiment, the propylene copolymers are propylene-ethylene copolymers with ethylenic contents of from about 0.2% to about 10% by weight. In one embodiment, the ethylene content is from about 3% to about 10% by weight and or from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-octene copolymers useful in the present invention may contain up to about 40% by weight of 1-octene. More often, the propylene-1-octene copolymers will contain up to about 20% by weight of 1-octene.

The propylene copolymers useful in preparing the film facestock of the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts. A list of some useful commercially available propylene copolymers is found in the following Table V. The propylene copolymers useful in the invention have an MFR of from about 1 to about 20, or from about 1 to about 12. Improved die-cuttability is obtained when the propylene copolymers have MFRs of at least about 4.

TABLE V

Commercial Propylene Copolymers

| Commercial Name | Source | % Ethylene | % 1-Butene | Melt Flow Rate (g/10 mins) | Density (g/cm3) |
|---|---|---|---|---|---|
| DS4D05 | Dow Chemical | — | 14 | 6.5 | 0.890 |
| DS6D20 | Dow Chemical | 3.2 | — | 1.9 | 0.890 |
| DS6D81 | Dow Chemical | 5.5 | — | 5.0 | 0.90 |
| SR4-189 | Dow Chemical | — | 8 | 5.7 | 0.90 |

In another embodiment of the invention, the base layer may comprise a high density polyethylene which is ultimately oriented in the machine direction. Polyethylene films having a density above about 0.940 g/cm3 and up to about 0.980 g/cm3 which have been stretch oriented in the machine direction are particularly useful. Stretch ratios may range from about 2:1 to about 9:1. In this embodiment, a tie layer between the base layer and the first skin layer is optional because both layers contain polyethylene.

The base layer may contain other additives to modify the properties of the base layer and the facestock. In one embodiment, the core layer contains at least one pigment. For example, colorants may be included in the base layer such as TiO2, CaCO3, etc. The presence of small amounts of TiO2, for example, results in a white facestock. The pigments that can be used include titanium dioxide, both rutile and anatase crystal structure. In one embodiment, the pigment is added to the core layer material in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 265° C. Examples include polyethylene, polypropylene, polybutylene, polyester, nylon and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename PolyBatch White P8555 SD, which is identified as a white color concentrate having a coated rutile titanium dioxide concentration of 50% by weight in a polypropylene homopolymer carrier resin. Another example is Ampacet 110233 which is a product of Ampacet Corporation identified as a $TiO_2$ concentrate containing 50% rutile $TiO_2$ and 50% low density polyethylene. Another example is Ampacet 110069 which is a white color concentrate having titanium dioxide concentration of 70% in linear low denisty polyethylene (1 melt index). Other color concentrates may be used to provide other colors. In one embodiment, the film has an opacity of about 80 to about 90, or from about 81 to about 88, or from about 82 to about 85 for a 2.5 mil film.

Antiblock agents also can be included in the base layer. The antiblock agents are described above. The core layer may include the nucleating agents described above for the film compositions at similar treatment levels.

Figure 6A:
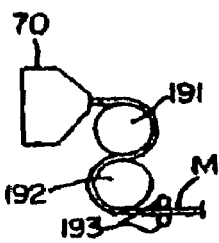
FIG. 6A is a schematic illustration of film extrusion.
Figure 6B:
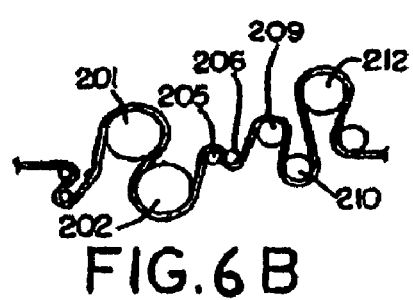
FIG. 6B is a schematic illustration of film hot stretching.
Figure 6C:
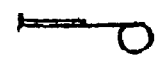
FIG. 6C is a schematic illustration of film be taken into roll form.

The extruded films which are machine-direction oriented may be prepared by the general procedure described and illustrated in FIGS. 6A-6C by extruding a charge of the desired propylene copolymer or by coextruding charges of the film-forming resins for the layers of the multilayer film to form extrudates.

Although FIG. 6A illustrates extrusion through cast film extrusion (i.e., through flat dies), the charge or charges for one or more layers can be extruded or coextruded in a known manner by blown film extrusion (i.e., by extrusion through circular dies) followed by passing of the blown stock between rolls.

With respect to the one embodiment, the charges may be prepared for extrusion or coextrusion through an extrusion die 70 and flat film casting, as schematically illustrated in FIG. 6A. The resin charge for the skin layers comprise, as noted above, a propylene copolymer and olefin elastomer as described herein. The resin charge for the inner layer comprises a homopolymer of propylene or a propylene copolymer as described above. The extruded film is cast on a first cooling roll 191, continues around a second cooling roll 192, and is advanced by pull-off rolls 193.

The stiffness of the film is important for proper dispensing of labels. FIG. 6B illustrates a hot-stretching station at which the tensile modulus of the flat stock M is increased in the machine-direction, typically at a stretch ratio of 9 or less, or between 3 and 7, and or at about 4 to 6. The increase in the MD tensile modulus of the film contributes to dimensional stability and good print registration. After passing around a pair of pre-heat rolls 201 and 202 which soften the stock, the softened stock is then stretched between the orientation roll pair 205 and 206, the latter rotating at a multiple of the speed of the pre-heat rolls, corresponding to the stretch ratio, say 5.5 to 1 or 6.5 to 1. The stock then passes over the annealing rolls 209, 210 at which it is annealed or heat-set, and finally passes over the chili roll 212 to complete the hot-stretch operation. The stock may then be taken up in roll form as seen in FIG. 6C. Is heated for a time 1.5 to 4, or 2 to 3 times longer in preheating step than in annealing step. In one embodiment, the film is oriented at 230, or above 240 or above 245 degrees F. The annealing temperatures are above 245, or above 250, or above 255 degrees F. A useful annealing is 260 degrees F.

The stiffness of the machine-direction-oriented single and multilayer films prepared by the general procedure described above should be at least about 10 and as high as 100 Gurley in the machine-direction. In one embodiment, the films are characterized as having a Gurley stiffness in the machine-direction of from about 10 to about 60 and or from about 10 to about 40. Stiffness is measured in accordance with the TAPPI Gurley Stiffness Test T 543 pm. In one embodiment, the tensile modulus in the cross-direction is substantially less than the tensile modulus in the machine-direction. In another embodiment, the tensile modulus in the cross-direction is less than about 0.75 times the tensile modulus in the machine-direction.

In one embodiment, the CD elongation is substantially greater than the MD elongation. Also, the CD elongation of the films of the invention will be greater than 30%, or 50%, or greater than 100%, and even greater than 300%.

Figure 7A:
FIG. 7A is a schematic illustration of coating adhesion or release coating manufacturing steps.

In the manufacture of label stock from the above-described films in accordance with the invention, liner or carrier stock 10 (FIGS. 7A-7D) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating (e.g., a silicone) at station R, as shown in FIG. 7A. If a release coating is applied, it is dried or cured following application by any suitable means (not shown).

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Figure 7B:
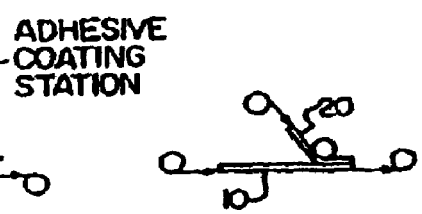
FIG. 7B is a schematic illustration of the manufacturing step of joining liner or carrier with a facestock.

Thus, as indicated in FIG. 7A, adhesive may be applied at station S following drying or cure of the release coat previously applied at station R. this may be a tandem coating operation, or the adhesive coating may be on a separate coating line. Alternatively, the adhesive may be applied at some later time prior to the joining of the release liner or carrier 10 with the facestock 20. The joining of the liner or carrier with a facestock 20 is illustrated in FIG. 7B. Alternatively, the adhesive may be coated directly on the facestock 20 prior to the combining of the facestock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine-direction. The MD tensile properties of the facestock film are particularly important when a polymeric film liner is used or when no liner is required.

Figure 7C:
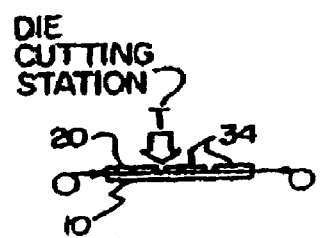
FIG. 7C is a schematic illustration of the die cutting.

FIG. 7C illustrates the die-cutting of the facestock 20, at a station T, into a series of spaced pressure-sensitive labels 34 carried by the release liner or carrier 10. This step may be performed by rotary cutting dies in a well-known manner and involves the stripping of the ladder-shaped matrix (not shown) of waste or trim surrounding the formed labels when they are die cut (the "rungs" of the ladder representing the spacing between successive labels). In one embodiment, magnetic dies may be used in place of the rotary dies. The labels then remain on the liner in spaced relation with each other, as shown. One failure mode in this operation involves poorly die-cut labels remaining with the matrix as it is stripped. In this mode, as release levels decrease, poor die cutting is more likely to cause labels to stay attached to the matrix material and be removed from the liner during matrix stripping. Another failure mode results when the films being die-cut are of insufficient strength. As the strength of the matrix material decreases, the matrix tends to tear as the matrix around the die-cut labels is pulled from the liner. The films of the present invention do have sufficient strength to avoid or reduce breakage of the matrix on stripping.

Figure 7D:
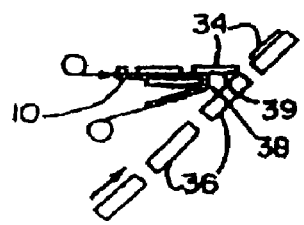
FIG. 7D is a schematic illustration of the application of labels to a workpiece.

FIG. 7D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36. In the context of the present invention, the workpieces 36 may constitute rigid substrates such as glass bottles or other rigid articles tending to have irregularities in the surface and therefore requiring labels that are flexible and that closely adhere (conform) to the surface without bridging local surface depressions.

It will be understood that the operations shown in FIGS. 7A to 7D may be done at different locations by different manufacturers, or they may be combined. For example, the steps of FIG. 7A may be performed by a liner and adhesive manufacturer, the steps of FIGS. 7B and 7C may be performed by a label manufacturer on one continuous pass rather than being interrupted by a wind/unwind sequence as illustrated, and the steps of FIG. 7D may be performed by a package of manufactured products.

Facestock which is formed into labels is usually wound and unwound in roll form, and is therefore one form of what is known as "roll stock" or "roll facestock," and the accompanying liner or carrier is called "roll liner."

The die-cut labels prepared from composites comprising the machine-direction oriented films and an adhesive layer provide acceptable labeling of rigid substrates such as glass with a label of sufficient flexibility and conformability to accommodate irregular or undulating glass surface characteristics resulting from the glass manufacturing process. Overly stiff label films such as biaxially oriented films tend to result in labels which bridge the depressions and mold seams in the glass surface, and the depressions appear as trapped air between the label and the glass surface.

In one embodiment, the machine-direction oriented propylene copolymer films of the present invention, and labels prepared therefrom, are characterized as being clear or crystal clear. Thus, the oriented films of the present invention have an opacity of about 10% or less and a haze of about 10% or less in the machine-direction and in the cross direction. In one embodiment, the opacity and the haze are 8% or less. In another embodiment the haze is about 5% or less. The opacity of the films is measured using TAPPI Test T 425 os, and haze is measured in accordance with ASTM Test Method D-1003.

The films may be treated to improve their printability. The procedures for treating the films is know and includes corona, plasma and other treatments. A particularly useful treatment is treating the film at 6.5-8 KW at a line speed of 400 to 450 feet per minute. The watt density is about 2-3 watts/ft2/min.

Useful three layer multilayer films are prepared by coextruding the film compositions of Example 1-32 as skin layers with a core formed from Huntsman propylene homopolymer P4G4K-038, where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 250 degrees F. and annealed at 265 degrees F.

Useful three layer multilayer films are prepared by coextruding the film compositions of Example 1-32 as skin layers with a core formed from Huntsman propylene copolymer P5M4K-046, where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 245 degrees F. and annealed at 270 degrees F.

Useful two layer multilayer films are prepared by coextruding the film compositions of Example 1-32 as a skin layer with a core formed from Huntsman propylene copolymer P5M4K-046, where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 235 degrees F. and annealed at 260 degrees F.

Useful two layer multilayer film are prepared by coextruding the film compositions of Example 1-32 as a skin layer with a core formed from Huntsman propylene homopolymer P4G4K-038, where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 240 degrees F. and annealed at 275 degrees F.

Useful three layer multilayer films are prepared by coextruding the film compositions of Example 1-32 as skin layers with a core formed from BP Amoco propylene copolymer 8439, where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 260 degrees F. and annealed at 280 degrees F.

Useful two layer multilayer films are prepared by coextruding the film compositions of Example 1-32 as a skin layer with a core formed from BP Amoco propylene copolymer 8439, where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 255 degrees F. and annealed at 270 degrees F.

Useful three layer multilayer films are prepared by coextruding the film compositions of Example 1-32 as skin layers with a core formed from 95% Huntsman propylene copolymer P5M4K-046 blended with 5% by weight Exact 4151, where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 245 degrees F. and annealed at 270 degrees F.

Useful two layer multilayer films are prepared by coextruding the film compositions of Example 1-32 as a skin layer with a core formed from 95% by weight Huntsman propylene copolymer P5M4K-046 blended with 5% by weight Exact 4151, where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 235 degrees F. and annealed at 260 degrees F.

Useful three layer multilayer films are prepared by coextruding the film compositions of Example 1-32 as a print skin layer with a core formed from 95% Huntsman propylene copolymer P5M4K-046 and 5% Exact 4151 and an adhesive skin layer formed from 95% Huntsman propylene copolymer P5M4K-046, 5% Exact 4151 and 1% Ampacet 10919 (processing aid), where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 245 degrees F. and annealed at 270 degrees F.

Useful two layer multilayer films are prepared by coextruding the film compositions of Example 1-32 as a skin layer with a core formed from 95% Huntsman propylene copolymer P5M4K-046 and 5% Huntsman L8148 (LLDPE with Melt index 0.9 and density), where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 235 degrees F. and annealed at 260 degrees F.

Useful three layer multilayer white films are prepared by coextruding the film compositions of Example 1-32 as a print skin layer with a core formed from 66% Huntsman propylene copolymer P5M4K-046, 13% Exact 4151 and 21% Ampacet 110069 (70% titanium dioxide in LLDPE (melt index 1)) and an adhesive skin layer formed from 95% Huntsman propylene copolymer P5M4K046 and 5% Huntsman L8148 (LLDPE with Melt index 0.9 and density), where the core is extruded at a temperature of 470 degrees F. and the skin layers are extruded at a temperature of 450 degrees F. to produce a 2.5 mil multilayer film having two skins each accounting for 7.5% of the thickness of the multilayer film and the core accounting for the balance of the thickness of the film. The film is machine oriented to a stretch ratio of 6.5:1 at 245 degrees F. and annealed at 270 degrees F.

Useful two layer multilayer white films are prepared by coextruding the film compositions of Example 1-32 as a print skin layer with a core formed from 95% Huntsman propylene copolymer P5M4K-046 and 5% Exact 4151 and an adhesive skin layer formed from 95% Huntsman propylene copolymer P5M4K046, 5% Exact 4151 and 1% Ampacet 10919 (processing aid), where the core is extruded at a temperature of 470 degrees F. and the skin layer is extruded at a temperature of 450 degrees F. to produce a 2.5 mil multilayer film having one skin which accounts for 15% of the thickness of the multilayer film and the core accounting for the balance of the thickness of the film. The film is machine oriented to a stretch ratio of 6.5:1 at 235 degrees F. and annealed at 260 degrees F.

Monolayer films are prepare by extruding the film compositions of Examples 1-22 at 450 degrees F. to form a 2.5 mil film. The film is machine oriented to a stretch ratio of 6.5:1 at 245 degrees F. and annealed at 265 degrees F.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. An adhesive containing labelstock for use in adhesive labels which comprises
   (A) a machine direction oriented polymeric film having an upper surface and a lower surface, comprising (A-1) at least one propylene homopolymer, copolymer or blend of two or more thereof wherein (A-1) has a melt flow rate of from about 8 to about 40 g/10 min., and (A-2) at least one olefin elastomer, wherein the film is oriented in the machine direction only at a stretch ratio of about 4:1 to 9:1 and the film has a tensile modulus in the cross direction that is less than about 0.75 times the tensile modulus in the machine direction and
   (B) an adhesive layer having an upper surface and a lower surface wherein the upper surface of the adhesive layer is adhesively joined to the lower surface of the film (A).

2. The labelstock of claim 1 wherein the adhesive layer is a pressure-sensitive adhesive layer.

3. The labelstock of claim 1 wherein (A-1) has a melt flow rate of from about 8 to about 32.

4. The labelstock of claim 1 wherein (A-1) is a propylene homopolymer.

5. The labelstock of claim 1 wherein (A-1) is a propylene copolymer prepared from propylene and an olefin having 2 or 4 to about 12 carbon atoms.

6. The labelstock of claim 5 wherein the propylene copolymer is a copolymer of propylene and one or more of ethylene, butylene, hexene, heptene, octene, nonene or decene.

7. The film of claim 1 wherein (A-1) is a propylene ethylene copolymer or propylene butylene copolymer.

8. The film of claim 1 wherein (A-2) is an ethylene homopolymer or copolymer, propylene homopolymer or copolymer, or mixtures of two or more thereof.

9. The film of claim 1 wherein (A-2) is a ethylene-butene copolymer, ethylene-octene copolymer, ethylene-hexene copolymer, ethylene-hexene-butene terpolymer, or mixtures of two or more thereof.

10. The labelstock of claim 1 wherein (A-1) or (A-2) contains a nucleating agent.

11. The labelstock of claim 1 wherein (A-1) is prepared using a metallocene catalyst.

12. The labelstock of claim 1 wherein (A-2) is prepared using a metallocene catalyst.

13. The labelstock of claim 1 wherein the adhesive layer is a heat-activated adhesive layer or a hot-melt adhesive layer.

14. An in-mold label die-cut from the labelstock of claim 13.

15. An adhesive containing labelstock for use in adhesive labels which comprises
   (A) a base layer having an upper surface and a lower surface, said base layer comprising a polyethylene having a density of above about 0.940 g/cm$^3$, a propylene homopolymer or copolymer, or a mixture of two or more thereof,
   (B) a first skin layer comprising (B-1) at least one propylene homopolymer, propylene copolymer or a blend of two or more thereof wherein (B-1) has a melt flow rate of from about 8 to about 40 g/10 min, and (B-2) at least one olefin elastomer, wherein said first skin layer overlies the upper surface of the base layer,
   (C) a second skin layer having an upper surface and a lower surface wherein the upper surface of the second skin layer underlies the lower surface of the base layer, wherein the second skin layer comprises (C-1) at least one propylene homopolymer, propylene copolymer or a blend of two or more thereof wherein (C-1) has a melt flow rate of from about 8 to about 40 g/10 min, and (C-2) at least one olefin elastomer, provided the compositions of the skin layers are different from the composition of the base layer, and
   (D) an adhesive layer having an upper surface and a lower surface wherein the upper surface of the adhesive layer is adhesively joined to the lower surface of the second skin layer.

16. The labelstock of claim 15 wherein the adhesive layer is a pressure-sensitive adhesive layer.

17. A pressure-sensitive adhesive label die-cut from the labelstock of claim 2.

18. A pressure-sensitive adhesive label die-cut from the labelstock of claim 16.

19. The labelstock of claim 15 wherein the base layer (A) comprises a propylene homopolymer or copolymer, or a mixture of two or more thereof, the base layer (A) has a melt flow rate of at least 4 g/10 min, and layers (A), (B) and (C) are oriented in the machine direction.

20. The labelstock of claim 19 wherein the layers are oriented by stretching in the machine direction at a stretch ratio of about 2:1 to about 9:1.

21. The labelstock of claim 15 wherein the adhesive layer is a heat-activated adhesive layer or a hot-melt adhesive layer.

22. An in-mold label die-cut from the labelstock of claim 21.

23. An adhesive containing labelstock for use in adhesive labels which comprises:
   (A) a machine direction oriented multilayer film comprising:
   (A-1) a base layer having an upper surface and a lower surface, and comprising a propylene homopolymer, a propylene copolymer, or mixtures of two or more thereof, (A-2) a first skin layer comprising (A-2a) at least one propylene homopolymer, copolymer or blend of two or more thereof wherein (A-2a) has a melt flow rate from about 8 to about 40 g/10 min and (A-2b) at least one olefin elastomer wherein said skin layer overlies the upper surface of the base layer, provided the composition of the first skin layer is different from the composition of the base layer, and (B) an adhesive layer having an upper surface and a lower surface wherein the upper surface of the adhesive layer is adhesively joined to the lower surface of the base layer.

24. The labelstock of claim 23 wherein the base layer comprises a propylene homopolymer.

25. The labelstock of claim 23 wherein the base layer comprises a propylene copolymer.

26. The labelstock of claim 23 wherein the base layer or first skin layer, or both, also contain a nucleating agent.

27. The labelstock of claim 23 wherein the olefin elastomer (A-2b) is an ethylene homopolymer or copolymer, propylene homopolymer or copolymer, or a mixture of two or more thereof.

28. The labelstock of claim 23 wherein the olefin elastomer (A-2b) is an ethylene copolymer.

29. The labelstock of claim 23 wherein the olefin elastomer (A-2b) is an ethylene-butene copolymer, ethylene-hexene copolymer, ethylene-hexene-butene terpolymer, ethylene-octene copolymer or a mixture of two or more thereof.

30. The labelstock of claim 23 wherein the elastomer (A-2b) is prepared using a metallocene catalyst.

31. The labelstock of claim 23 wherein the multilayer film (A) is oriented in the machine direction only.

32. The labelstock of claim 31 wherein the multilayer film is oriented by stretching in the machine direction at a stretch ratio of about 2:1 to about 9:1.

33. The labelstock of claim 23 wherein the multilayer film (A) comprises a second skin layer having an upper surface and a lower surface wherein the upper surface of the second skin layer underlies the lower surface of the base layer, and the upper surface of the adhesive layer (B) is adhesively joined to the lower surface of the second skin layer.

34. The labelstock of claim 33 wherein the composition of the second skin layer is different from the composition of the first skin layer.

35. The labelstock of claim 33 wherein the adhesive layer is a pressure-sensitive adhesive layer.

36. The labelstock of claim 33 wherein the adhesive layer is a heat-activated adhesive layer or a hot-melt adhesive layer.

37. The labelstock of claim 33 wherein the film is oriented in the machine direction.

* * * * *